United States Patent
Chae et al.

(10) Patent No.: US 10,375,207 B2
(45) Date of Patent: Aug. 6, 2019

(54) CONFIGURATION SETTING METHOD AND DEVICE

(71) Applicant: Samsung Electronics Co., Ltd, Gyeonggi-do (KR)

(72) Inventors: Sang Won Chae, Seoul (KR); Jung Wook Jang, Gyeonggi-do (KR); Ji Yoon Park, Gyeonggi-do (KR); Jung Eun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 15/438,616

(22) Filed: Feb. 21, 2017

(65) Prior Publication Data
US 2017/0244809 A1  Aug. 24, 2017

(30) Foreign Application Priority Data

Feb. 19, 2016 (KR) .......................... 10-2016-0020034

(51) Int. Cl.
*H04L 29/08* (2006.01)
*H04L 12/24* (2006.01)

(52) U.S. Cl.
CPC .......... *H04L 67/34* (2013.01); *H04L 41/0813* (2013.01); *H04L 41/0869* (2013.01); *H04L 41/0879* (2013.01)

(58) Field of Classification Search
CPC ............................ H04L 67/34; H04L 41/0813; H04L 41/0869; H04L 41/0879; H04L 43/08
See application file for complete search history.

(56) References Cited

U.S. PATENT DOCUMENTS

| | | | |
|---|---|---|---|
| 6,266,693 B1 * | 7/2001 | Onaga .................. | G06F 3/1204 358/1.1 |
| 7,861,099 B2 | 12/2010 | Theocharous et al. | |
| 8,316,247 B2 | 11/2012 | Theocharous et al. | |
| 8,935,547 B2 | 1/2015 | Theocharous et al. | |
| 9,176,720 B1 * | 11/2015 | Day-Richter ............. | G06F 8/63 |
| 9,848,076 B2 * | 12/2017 | Park .................. | H04M 1/72597 |
| 9,940,579 B2 * | 4/2018 | Sun ...................... | G06F 11/3636 |
| 10,042,624 B2 * | 8/2018 | Byrnes .................... | H04L 29/04 |
| 10,083,018 B1 * | 9/2018 | Rizea ........................ | G06F 8/60 |
| 10,158,536 B2 * | 12/2018 | Kim .................... | H04L 12/2807 |
| 10,203,848 B2 * | 2/2019 | Sirpal ................... | G06F 1/1616 |
| 2008/0005599 A1 | 1/2008 | Theocharous et al. | |
| 2011/0093725 A1 | 4/2011 | Theocharous et al. | |

(Continued)

FOREIGN PATENT DOCUMENTS

KR    1020130132132    12/2013

*Primary Examiner* — Shean Tokuta

(57) ABSTRACT

An electronic device includes a communication module that communicates with a server and a processor. The processor is configured to transmit, if an application is installed or executed, identification information of the application to the server through the communication module, to receive pieces of configuration setting information corresponding to the identification information from the server, to verify an execution status of the application, to verify configuration setting information that corresponds to the execution status of the application from among the pieces of configuration setting information, and to change an execution configuration of the application based on the verified configuration setting information.

15 Claims, 12 Drawing Sheets

(56) References Cited

U.S. PATENT DOCUMENTS

| | | | |
|---|---|---|---|
| 2011/0118022 A1* | 5/2011 | Aronzon | A63F 13/42 463/37 |
| 2011/0302274 A1* | 12/2011 | Lee | H04N 21/25816 709/217 |
| 2012/0233480 A1 | 9/2012 | Tanaka | |
| 2012/0272231 A1* | 10/2012 | Kwon | G06F 8/61 717/173 |
| 2013/0014006 A1* | 1/2013 | Abellera | G06F 3/04817 715/234 |
| 2013/0080807 A1 | 3/2013 | Theocharous et al. | |
| 2013/0151996 A1* | 6/2013 | Nario | G06F 9/445 715/760 |
| 2013/0166789 A1* | 6/2013 | Lee | G06F 13/10 710/15 |
| 2014/0059534 A1* | 2/2014 | Daum | G06F 8/65 717/172 |
| 2014/0075438 A1* | 3/2014 | He | H04L 67/08 718/1 |
| 2014/0108491 A1* | 4/2014 | Fan | H04L 67/10 709/201 |
| 2014/0208088 A1* | 7/2014 | Somani | G06F 8/65 713/1 |
| 2014/0242969 A1* | 8/2014 | Shimizu | H04M 1/72525 455/419 |
| 2014/0282476 A1* | 9/2014 | Ciudad | G06F 8/65 717/171 |
| 2015/0006638 A1* | 1/2015 | Jain | H04L 51/32 709/204 |
| 2015/0046994 A1* | 2/2015 | Sinha | H04L 41/0806 726/7 |
| 2015/0134376 A1* | 5/2015 | Shima | G06Q 10/02 705/5 |
| 2015/0236912 A1* | 8/2015 | Zhang | H04L 41/0889 370/338 |
| 2015/0282246 A1* | 10/2015 | Teyeb | H04W 36/0072 370/312 |
| 2015/0286820 A1* | 10/2015 | Sridhara | G06F 21/566 726/23 |
| 2015/0370428 A1* | 12/2015 | Chan | H04L 67/1095 715/739 |
| 2015/0378714 A1* | 12/2015 | Katariya | G06F 8/65 717/170 |
| 2015/0381547 A1* | 12/2015 | Mandanapu | H04L 51/24 709/206 |
| 2016/0070466 A1* | 3/2016 | Chaudhri | G06F 3/0484 715/765 |
| 2016/0078362 A1* | 3/2016 | Christodorescu | G06F 21/566 706/12 |
| 2016/0092189 A1* | 3/2016 | Pollack | G06F 8/65 717/175 |
| 2016/0099963 A1* | 4/2016 | Mahaffey | H04L 63/0227 726/25 |
| 2016/0103648 A1* | 4/2016 | Reeves | G06F 1/1616 345/173 |
| 2016/0110754 A1* | 4/2016 | Miyazaki | G06F 8/61 705/14.39 |
| 2016/0119259 A1* | 4/2016 | Li | H04L 51/066 709/204 |
| 2016/0170547 A1* | 6/2016 | Zhang | G06F 3/04883 345/173 |
| 2016/0170632 A1* | 6/2016 | Zhang | G06F 3/04883 345/173 |
| 2016/0179816 A1* | 6/2016 | Glover | G06F 17/3053 707/749 |
| 2016/0188543 A1* | 6/2016 | Glover | G06F 17/2235 715/208 |
| 2016/0191611 A1* | 6/2016 | Srinivasan | H04L 67/10 709/201 |
| 2016/0210709 A1* | 7/2016 | Uchida | G06Q 50/184 |
| 2016/0217241 A1* | 7/2016 | Kaniwa | G06F 17/5045 |
| 2016/0292432 A1* | 10/2016 | Seo | H04L 63/0428 |
| 2016/0299771 A1* | 10/2016 | Navarro | G06F 17/50 |
| 2016/0302023 A1* | 10/2016 | Stoner | H04M 1/72525 |
| 2016/0357394 A1* | 12/2016 | Tae | G06F 3/0488 |
| 2016/0360059 A1* | 12/2016 | Homma | H04N 1/00962 |
| 2016/0378965 A1* | 12/2016 | Choe | G06F 21/32 726/19 |
| 2017/0031675 A1* | 2/2017 | Oshima | H04L 67/34 |
| 2017/0063975 A1* | 3/2017 | Prakash | H04L 67/1002 |
| 2017/0083399 A1* | 3/2017 | Smirnov | G06F 11/0778 |
| 2017/0098196 A1* | 4/2017 | Adderly | G06Q 10/1095 |
| 2017/0104629 A1* | 4/2017 | Cobb | H04L 41/0816 |
| 2017/0111166 A1* | 4/2017 | Zheng | G06F 9/445 |
| 2017/0168854 A1* | 6/2017 | Rao | G06F 8/315 |
| 2017/0212487 A1* | 7/2017 | Gupta | G05B 19/042 |
| 2017/0223055 A1* | 8/2017 | Russo, Jr. | H04L 63/20 |
| 2017/0329560 A1* | 11/2017 | Hori | G06F 3/1204 |
| 2018/0189478 A1* | 7/2018 | Richardson | G06F 21/51 |
| 2019/0042082 A1* | 2/2019 | Webber | G06Q 10/107 |

* cited by examiner

CONFIGURATION SETTING METHOD AND DEVICE

CROSS-REFERENCE TO RELATED APPLICATION(S) AND CLAIM OF PRIORITY

The present application is related to and claims the benefit under 35 U.S.C. § 119(a) of a Korean patent application filed on Feb. 19, 2016 in the Korean Intellectual Property Office and assigned Serial number 10-2016-0020034, the entire disclosure of which is hereby incorporated by reference.

TECHNICAL FIELD

The present disclosure relates to a method and a device that set an execution configuration of an application.

BACKGROUND

With the development of electronic technologies, various types of electronic devices are being developed and supplied. In particular, smart electronic devices, such as a smartphone, a tablet personal computer (PC), a smart TV, and the like have come into wide use.

According to the multifunction of an electronic device, the electronic device provides various services such as a shooting service, an e-mail service, a music/video playing service, a social networking service (SNS), a messaging service, a game, and the like through one electronic device.

The services may be provided to a user of the electronic device through an application that is installed in the electronic device. After the user touches the application on the electronic device, the user may set an execution configuration of the application.

However, if the user employs various types of applications, the user needs to differently set execution configurations, which are suitable for the applications, based on characteristics of the applications. Furthermore, in the case of one application, the user needs to differently set execution configurations based on the execution status of the application.

SUMMARY

To address the above-discussed deficiencies, it is a primary object to provide a method and a device that set an execution configuration of an application for each application or for each execution status of the application.

In accordance with an aspect of the present disclosure, an electronic device includes a communication module that communicates with a server and a processor. The processor is configured to transmit, if an application is installed or executed, identification information of the application to the server through the communication module, to receive pieces of configuration setting information corresponding to the identification information from the server, to verify an execution status of the application, to verify configuration setting information, which corresponds to the execution status of the application, from among the pieces of configuration setting information, and to change an execution configuration of the application based on the verified configuration setting information.

In accordance with another aspect of the present disclosure, a server includes a communication module that communicates with an electronic device, a memory, and a processor. The processor is configured to store an application list in the memory, to store pieces of configuration setting information based on an execution status of each of applications included in the application list, to receive identification information of an application, which is installed or executed in the electronic device, from the electronic device through the communication module, and to transmit the pieces of configuration setting information corresponding to the identification information to the electronic device. The pieces of configuration setting information include first configuration setting information corresponding to a first execution status of the application and second configuration setting information corresponding to a second execution status of the application.

In accordance with another aspect of the present disclosure, a configuration setting method of an electronic device includes transmitting, if an application is installed or executed, identification information of the application to a server through a communication module, receiving pieces of configuration setting information corresponding to the identification information from the server, verifying an execution status of the application, selecting configuration setting information, which corresponds to the execution status of the application, from among the pieces of configuration setting information, and changing the execution configuration of the application based on the selected configuration setting information.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
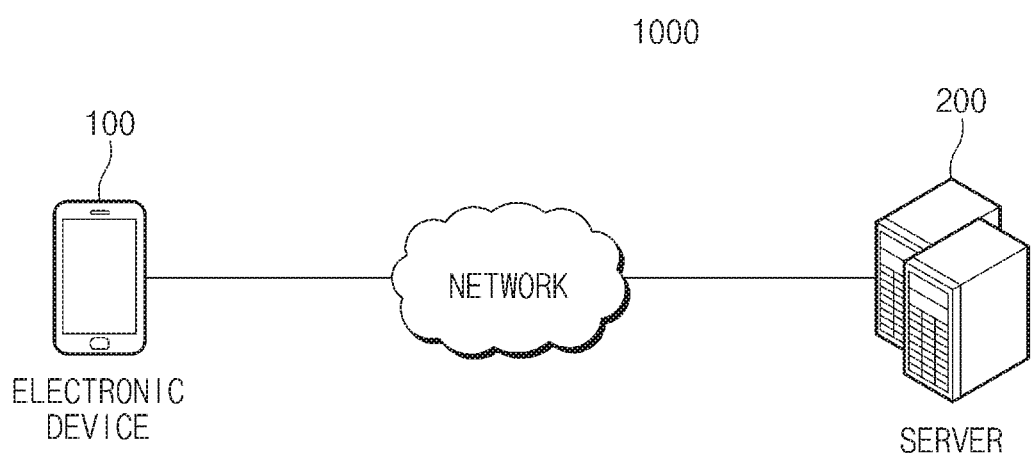
FIG. 1 is a diagram illustrating a configuration of a configuration setting system, according to various embodiments of the present invention.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The term "include," "comprise," and "have", or "may include," or "may comprise" and "may have" used herein indicates disclosed functions, operations, or existence of elements but does not exclude other functions, operations or elements.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a diagram illustrating a configuration of a configuration setting system, according to various embodiments of the present invention.

Referring to FIG. 1, a configuration setting system 1000 may include an electronic device 100 and a server 200. Each element included in the configuration setting system 1000 illustrated in FIG. 1 may be connected with each other through a network. For example, the electronic device 100 and the server 200 may be connected with each other through a mobile communication network or an Internet network.

According to an embodiment, the electronic device 100 may be a user device. For example, the electronic device 100 may be a smart electronic device, which is capable of installing and executing an application, such as a smartphone, a smart watch, a smart TV, or the like.

According to an embodiment, the server 200 may manage configuration setting information of the electronic device 100. The server 200 may manage an application list including at least one application that is installable in the electronic device 100. The server 200 may store configuration setting information of an application included in the application list. For example, the server 200 may collect operating information of each of a plurality of external electronic devices from the plurality of external electronic devices including the electronic device 100, may analyze the collected operating information, and may include pieces of configuration setting information based on an execution status of an application for each application included in the application list.

According to an embodiment, if the application is installed or executed, the electronic device 100 may transmit identification information of the application to the server 200 and may receive the configuration setting information corresponding to the application from the server 200. The electronic device 100 may execute the application based on the configuration setting information received from the server 200. For example, the electronic device 100 may verify the execution status of the application and may execute the application based on the configuration setting information corresponding to the execution status of the application. As such, the electronic device 100 may provide an execution configuration, which is suitable for the execution status of the application, without a user input.

Figure 2:
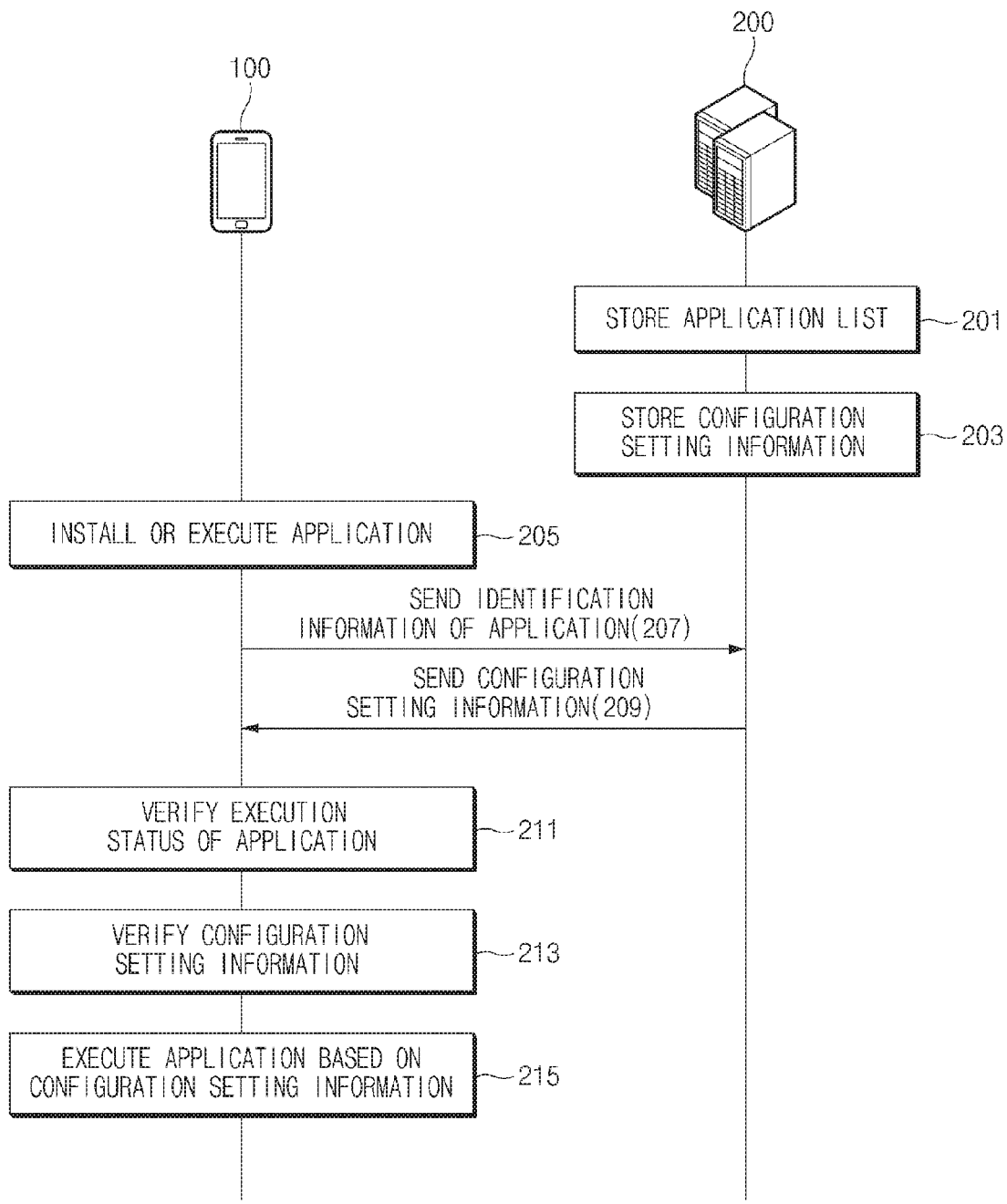
FIG. 2 is a drawing illustrating a configuration setting method of a configuration setting system, according to various embodiments of the present invention.

FIG. 2 is a drawing illustrating a configuration setting method of a configuration setting system, according to various embodiments of the present invention.

Referring to FIG. 2, in operation 201, the server 200 may store an application list. According to an embodiment, an application list may include an application that belongs to a specified category (e.g., a game). The application list may include, for example, application identification information. For example, the application list may include a name of an application installation package or a name of an application.

According to an embodiment, the server 200 may receive the application list from an external server and may store the received application list. For example, the server 200 may receive an application programming interface (API), which includes the application list belonging to the specified category (e.g., a game), from an application market.

According to an embodiment, the server 200 may add the application to the application list based on information (e.g., a name of an application or package information) about the application input from a server manager.

According to an embodiment, in operation 203, the server 200 may store configuration setting information. The configuration setting information may include at least one of, for example, a resolution of a display, a frame rate of the display, brightness of the display, a color format, a clock speed of a processor, and audio volume.

According to an embodiment, the server 200 may store the configuration setting information about each of applications included in the application list. According to an embodiment, the server 200 may receive operating information (or an activity log) of a plurality of external electronic devices from the plurality of external electronic devices including the electronic device 100. The operating information may include information about at least one of, for example, remaining capacity of a battery, temperature of the electronic device, processor usage, whether hardware is accelerated, a power saving mode, a size of a frame buffer, a resolution of the display, brightness of the display, a brightness adjusting mode of the display, a frame rate of the display, a color format, a Do Not Disturb mode, received frequency of a user input (e.g., how often a user input is received during a specified time), a type of a user input, user information (e.g., age of a user, gender of a user, or the like), whether an earphone is used, whether a charger is used, audio volume, a location of an electronic device, a name of an application being executed, an update type, a version of an application, a category of an application, an execution time of an application, or an execution status of an application (e.g., an execution stage of an application, whether a game mode is an auto play mode or a manual play mode, whether a user is playing with a war game, whether a game mode is a single player mode or a multi-player mode, the number of game participants, or the like). According to an embodiment, the server 200 may analyze operating information and may generate and store the configuration setting information about each of the applications based on the analyzed result.

According to an embodiment, the server 200 may receive pieces of configuration setting information, which are set according to an execution status each of applications included in the application list, from an external server (e.g., a content providing server) and may store the received pieces of configuration setting information.

According to an embodiment, the server 200 may store the pieces (e.g., two or more) of configuration setting information, which are set according to an execution status of each of applications, based on at least one of applications included in the application list, a model of an electronic device, a type of an operating system, and a version of an operating system. For example, the server 200 may store first configuration setting information corresponding to a first execution status of the application and second configuration setting information corresponding to a second execution status of the application for each application and each electronic device model. As another example, the server 200 may store the first configuration setting information corresponding to the first execution status of an application and the second configuration setting information corresponding to the second execution status of the application for each application, each operating system type, and each operating system version.

According to an embodiment, in operation 205, the electronic device 100 may install or execute the application.

According to an embodiment, in operation 207, the electronic device 100 may transmit identification information of the application, which is being installed or executed, to the server 200. The identification information of the application may include, for example, a name of an application installation package or a name of the application.

According to an embodiment, in operation 209, the server 200 may transmit the configuration setting information to the electronic device 100. While connected with the electronic device 100 through a network, the server 200 may receive at least one of information of the model of the electronic device 100, the type of an operating system, and the version of the operating system from the electronic device 100. The server 200 may verify the configuration setting information corresponding to the application, which is being installed or executed by the electronic device 100, in view of at least one of the model of the electronic device 100, the type of the operating system, and the version of the operating system and may transmit the verified configuration setting information to the electronic device 100.

According to an embodiment, in operation 211, the electronic device 100 may verify the execution status of the application. For example, in the case of a game application, the electronic device 100 may verify a stage or a play mode (e.g., a user manipulation mode or an auto play mode) in which the game application is being executed. As another example, in the case of a war game application, the electronic device 100 may determine whether a user is playing with a war game, whether the user is looking for a counterpart of the war game, or whether the user is in a standby state.

According to an embodiment, in operation 213, the electronic device 100 may verify the configuration setting information, which corresponds to the execution status of the application, from among the received configuration setting information from the server 200.

According to an embodiment, in operation 215, the electronic device 100 may execute the application based on the verified configuration setting information. That is, the electronic device 100 may change the execution configuration of the application based on the verified configuration setting information. For example, the electronic device 100 may change at least one of a resolution of the display, a frame rate of the display, brightness of the display, a color format, a clock speed of a processor, and audio volume, based on the verified configuration setting information.

In the above-mentioned embodiment, it is described that the server 200 transmits the configuration setting information to the electronic device 100 when the electronic device 100 requests application identification information (e.g., if the application identification information is received). However, according to another embodiment, even though there is no request of the electronic device 100, the server 200 may transmit the configuration setting information to the electronic device 100 periodically or whenever the stored configuration setting information is changed. In addition, in the above-mentioned embodiment, it is described that the server 200 transmits the configuration setting information corresponding to application identification information received from the electronic device 100. However, according to another embodiment, the server 200 may transmit all configuration setting information about the electronic device 100 to the electronic device 100 periodically or whenever the configuration setting information is changed, regardless of the application identification information. According to another embodiment, the server 200 may receive execution status information of the electronic device 100 as well as application identification information from the electronic device 100 and may transmit only the application identification information and the configuration setting information corresponding to the execution status of the electronic device 100 to the electronic device 100.

Figure 3:
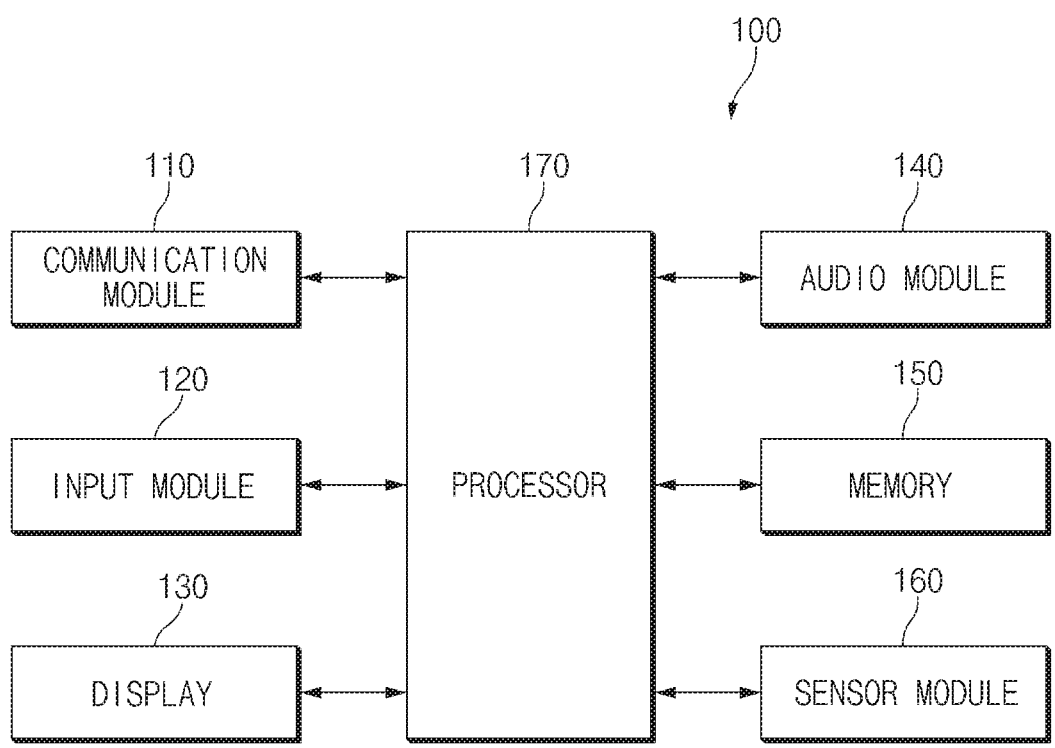
FIG. 3 is a block diagram illustrating a configuration of an electronic device, according to various embodiments of the present invention.

FIG. 3 is a block diagram illustrating a configuration of an electronic device, according to various embodiments of the present invention.

Referring to FIG. 3, the electronic device 100 may include a communication module 110, an input module 120, a display 130, an audio module 140, a memory 150, a sensor module 160, and a processor 170.

According to an embodiment, the communication module 110 may communicate with an external device (e.g., the server 200). According to an embodiment, the communication module 110 may transmit and receive data (e.g., application identification information, configuration setting information, or the like) to and from an external device through a network (e.g., a mobile communication network or an Internet network). According to an embodiment, the communication module 110 may include a cellular module, a wireless-fidelity (Wi-Fi) module, a Bluetooth™ module, or a near field communication (NFC) module.

According to an embodiment, the input module 120 may receive a user input. For example, the input module 120 may receive the user input for changing the configuration setting information. As another example, the input module 120 may receive a user input for adding a specific application to an application list.

In an embodiment, the input module 120 may include a touch sensor panel that senses a touch manipulation of a user or a pen sensor panel that senses a pen manipulation of a user. According to an embodiment, the touch sensor panel may include a pressure sensor that senses pressure of a user touch. The pressure sensor may be integrated with the touch sensor panel or may be implemented with one or more sensors that are independent of the touch sensor panel. According to an embodiment, the input module 120 may include an external input device (e.g., a keypad, a joystick, or the like) that is connected with the electronic device 100 by wire or wirelessly.

According to an embodiment, the display 130 may display a user interface. For example, the display 130 may display the user interface for changing the configuration setting information. As another example, the display 130 may provide the application list stored in the memory 150 and may display a user interface for adding a specific application to the application list.

According to an embodiment, the input module 120 and the display 130 may be implemented with a touch screen that is capable of displaying and sensing the touch manipulation at the same time. In the touch screen, an input panel may be disposed on the display panel.

According to an embodiment, the audio module 140 may process audio data. According to an embodiment, the audio module 140 may include a device associated with an audio input/output such as a speaker, a microphone, an audio interface that is capable of being connected with an audio output device, for example, an earphone, or the like, or the like.

According to an embodiment, the memory 150 may store an application list. For example, the memory 150 may store the application list received from the server 200, and the application list stored in the memory 150 may be changed based on the user input. According to an embodiment, the memory 150 may store the configuration setting information. The configuration setting information may include at least one of, for example, a resolution of the display 130, a frame rate of the display 130, brightness of the display 130, a color format, a clock speed of the processor 170, and audio volume.

According to an embodiment, the sensor module 160 may sense a state (or context) of the electronic device 100. According to an embodiment, sensor module 160 may include an acceleration sensor or a gyro sensor that is capable of sensing a motion of the electronic device 100 (e.g., acceleration, angular velocity, a slope, or the like).

According to an embodiment, the processor 170 may control overall operations of the electronic device 100. According to various embodiments, the processor 170 may set the execution configuration of the application by controlling each of the communication module 110, the input module 120, the display 130, the sensor module 160, and the memory 150. According to an embodiment, the processor 170 (e.g., an application processor) may be implemented with a system on chip (SoC) including a central processing unit (CPU), a graphic processing unit (GPU), a memory, and the like.

According to an embodiment, the processor 170 may install or execute the application based on the user input. For example, the processor 170 may download a specific application from an application market based on the user input and may install the specific application. The processor 170 may execute the application corresponding to an application icon based on the user input for selecting the application icon.

According to an embodiment, if the application is installed or executed, the processor 170 may transmit identification information of the application, which is being installed or executed, to the server 200. The identification information of the application may include, for example, a name of an application installation package or a name of the application.

According to an embodiment, the processor 170 may determine whether an application that is being installed or executed is included in the application list. If the application is included in the application list, the processor 170 may transmit the identification information of the application to the server 200 through the communication module 110.

According to an embodiment, the processor 170 may receive at least one configuration setting information corresponding to the identification information of the application from the server 200 through the communication module 110. The configuration setting information may include, for example, pieces of configuration setting information based on the execution status of the application. The processor 170 may store the received configuration setting information in the memory 150.

According to an embodiment, if the application is executed, the processor 170 may verify the execution status of the application. For example, in the case of a game application, the processor 170 may verify a stage or a play mode (e.g., a user manipulation mode or an auto play mode) in which the game application is being executed. As another example, in the case of a war game application, the electronic device 100 may determine whether a user is playing with a war game, whether the user is looking for a counterpart of the war game, or whether the user is in a standby state. As another example, in the case of a game application, the electronic device 100 may determine whether the game application is in a single player mode or in a multi-player mode. If the game application is in the multi-player mode, the electronic device 100 may verify how many players participate in the game application. As another example, in the case of an e-book application, the electronic device 100 may determine whether the e-book application is in a state where a text is currently displayed or in a state where a page turn effect is displayed. As another example, in the case of a video playing application, the electronic device 100 may determine whether the video is playing or the video playing is in a standby state.

According to an embodiment, the processor 170 may verify the execution status of an application based on the user input (e.g., a touch input of a user, a user input received from an external input device, or a motion of an electronic device sensed by the sensor module 160). For example, if the number of times that the user input is received is greater than or equal to a specified count for a specified time period, the processor 170 may determine that the application is executed in a user manipulation mode. If the number of times that the user input is received is less than a specified count for a specified time period, the processor 170 may determine that the application is executed in an auto play mode. As another example, in a state where a war game application is being executed, if the number of times that the user input is received is less than a first count for a specified time period, the processor 170 may determine that the war game application is in the standby state. In a state where a war game application is being executed, if the number of times that the user input is received is greater than or equal to the first count and less than a second count for a specified time period, the processor 170 may determine that the user is looking for a counterpart of the war game application. In a state where a war game application is being executed, if the number of times that the user input is received is greater than or equal to the second count for a specified time period, the processor 170 may determine that a user is playing with a war game. As another example, in the case of a game (e.g., a racing game) controlled according to the motion of an electronic device, if the motion, of which the amount is greater than or equal to the specified amount, is sensed for a specified time period, the processor 170 may determine that a user is playing with a game. In the case of a game controlled according to the motion of an electronic device, if the motion, of which the amount is smaller than the specified amount, is sensed for a specified time period, the processor 170 may determine that the game is in a standby state.

According to an embodiment, the processor 170 may verify the execution status of the application based on execution status information received from the application. According to an embodiment, the application may be programmed to provide the processor 170 with the execution status information. For example, the execution status information may include various pieces of information indicating the execution status of the application such as a stage in which a game is being played, whether the game is in an auto play mode or in a manual play mode, whether a user is playing with a war game, whether the game is in a single player mode or in a multi-player mode, the number of game participants in the case of the multi-player mode, or the like. The processor 170 may analyze the execution status information received from the application and may determine a current execution status of the application.

According to an embodiment, the processor 170 may verify the execution status of the application based on a change rate of an image that is displayed in the display 130 according to execution of the application. For example, in a state where a game application is being executed, if the change rate of the image displayed in the display 130 is less than a first change rate, the processor 170 may determine that the execution status of the application is a standby state, and if the change rate of the image displayed in the display 130 is greater than or equal to the first change rate, the processor 170 may determine that the execution status of the application is a playing state. For example, the change rate of the image may indicate a ratio of the number of pixels, of which values are changed as an image frame is changed, to the number of total pixels of the display 130.

According to an embodiment, if the execution status of the application is verified, the processor 170 may verify the configuration setting information corresponding to the execution status of the application. For example, the processor 170 may verify the configuration setting information, which corresponds to the application being executed, from among the configuration setting information stored in the memory 150. If the configuration setting information corresponding to the application includes pieces of configuration setting information based on the execution status of the application, the processor 170 may verify the configuration setting information, which corresponds to the execution status of the application being executed, from among the pieces of configuration setting information.

According to an embodiment, the processor 170 may execute the application based on the verified configuration setting information. That is, the processor 170 may change the execution configuration of the application based on the verified configuration setting information. For example, the processor 170 may change at least one of a resolution of a display, a frame rate of the display, brightness of the display, a color format, a clock speed of a processor, and audio volume, based on the verified configuration setting information. According to an embodiment, the processor 170 may monitor the execution status of the application. If the execution status of the application is changed, the processor 170 may execute the application based on the configuration setting information corresponding to the changed execution status.

According to an embodiment, when changing the execution configuration of the application, the processor 170 may allow the execution configuration of the application to be gradually changed over a specified time period. For example, in the case where the configuration setting information is changed to be greater than or equal to a specified reference value (e.g., change 30% or more based on the maximum value), the processor 170 may allow the configuration setting information to be gradually changed over a specified time period. According to an embodiment, if a specified user input is received while the execution configuration of the application is being changed, the processor 170 may immediately change the execution configuration of the application based on the changed configuration setting information.

According to an embodiment, when changing the execution status of the application, the processor 170 may allow only a part of the display to be changed. For example, in the case where brightness of the display is changed, the processor 170 may change only brightness of the remaining area other than a specific object (e.g., a car of a user in a racing game, a character of a user in a role playing game, or the like) displayed in the display 130.

According to various embodiments, the processor 170 may periodically receive the configuration setting information from the server 200 through the communication module 110. For example, the configuration setting information may be received from the server 200 periodically as well as when the application is installed or executed, and may be stored in the memory 150. The memory 150 may store the up-to-date configuration setting information. As such, if the application is executed, the processor 170 may verify the configuration setting information corresponding to the execution status of the application without transmitting the application identification information to the server 200 and may execute the application based on the verified configuration setting information.

Figure 4:
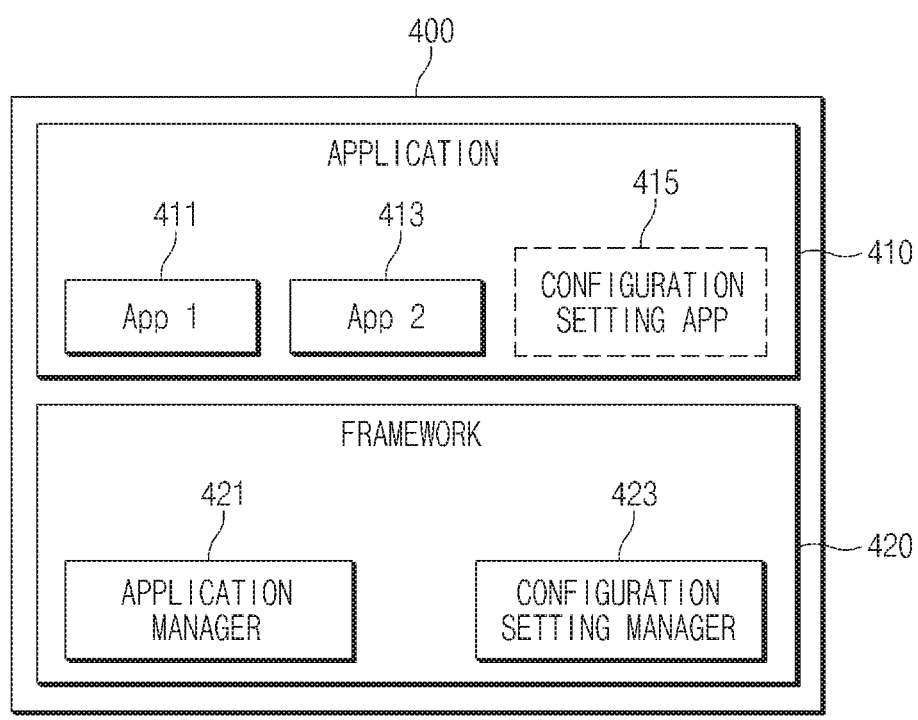
FIG. 4 is a block diagram illustrating a program module, according to various embodiments of the present invention.

FIG. 4 is a block diagram illustrating a program module, according to various embodiments of the present invention.

A program module 400 illustrated in FIG. 4 may be executed by the processor 170. According to an embodiment, the program module 400 may include an application 410 and a framework 420.

According to an embodiment, the application 410 may include a plurality of applications 411, 413, and 415. Each of the plurality of applications 411, 413, and 415 may be executed by the processor 170 and may provide a user with a specific function or service.

According to an embodiment, the application 410 may include a configuration setting application 415. The configuration setting application 415 may be an application that manages, for example, an application list and configuration setting information. The configuration setting application 415 will be described with reference to FIG. 5.

According to an embodiment, the framework 420 may include an application manager 421 and a configuration setting manager 423. The application manager 421 may manage installation and execution of the application 410. For example, the application manager 421 may manage the application list. If an application is installed or executed, the application manager 421 may verify identification information of the application and may verify the execution status of the application, which is being executed, based on the verified result. The application manager 421 may transmit information about the execution status to the server 200.

The configuration setting manager 423 may manage the execution configuration of the application. The configuration setting manager 423 may manage the configuration setting information and may change the execution configuration of the application based on the configuration setting information corresponding to the execution status of the application received from the application manager 421. According to an embodiment, the configuration setting manager 423 may change the execution configuration of the application based on a user input. If the execution configuration of the application is changed by a user, the configuration setting manager 423 may transmit the changed configuration setting information to the server 200.

Figure 5A:
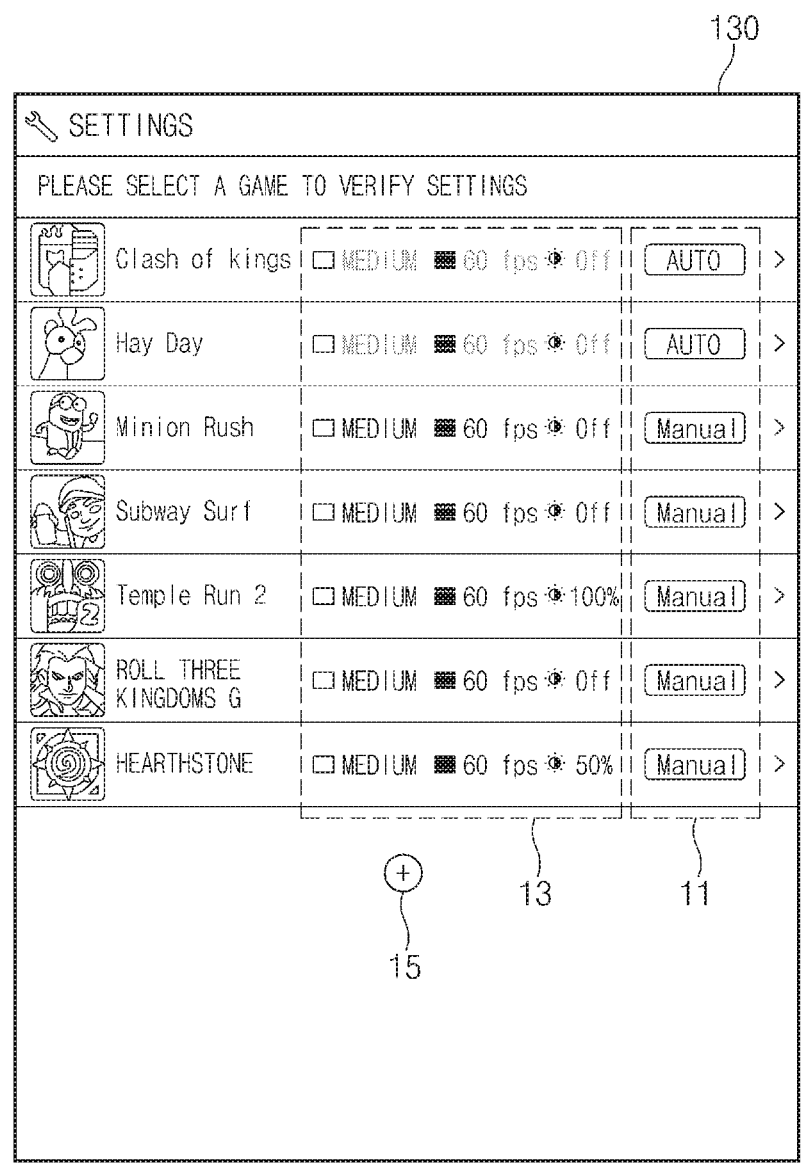
FIGS. 5A and 5B are drawings illustrating user interfaces, according to various embodiments of the present invention.
Figure 5B:
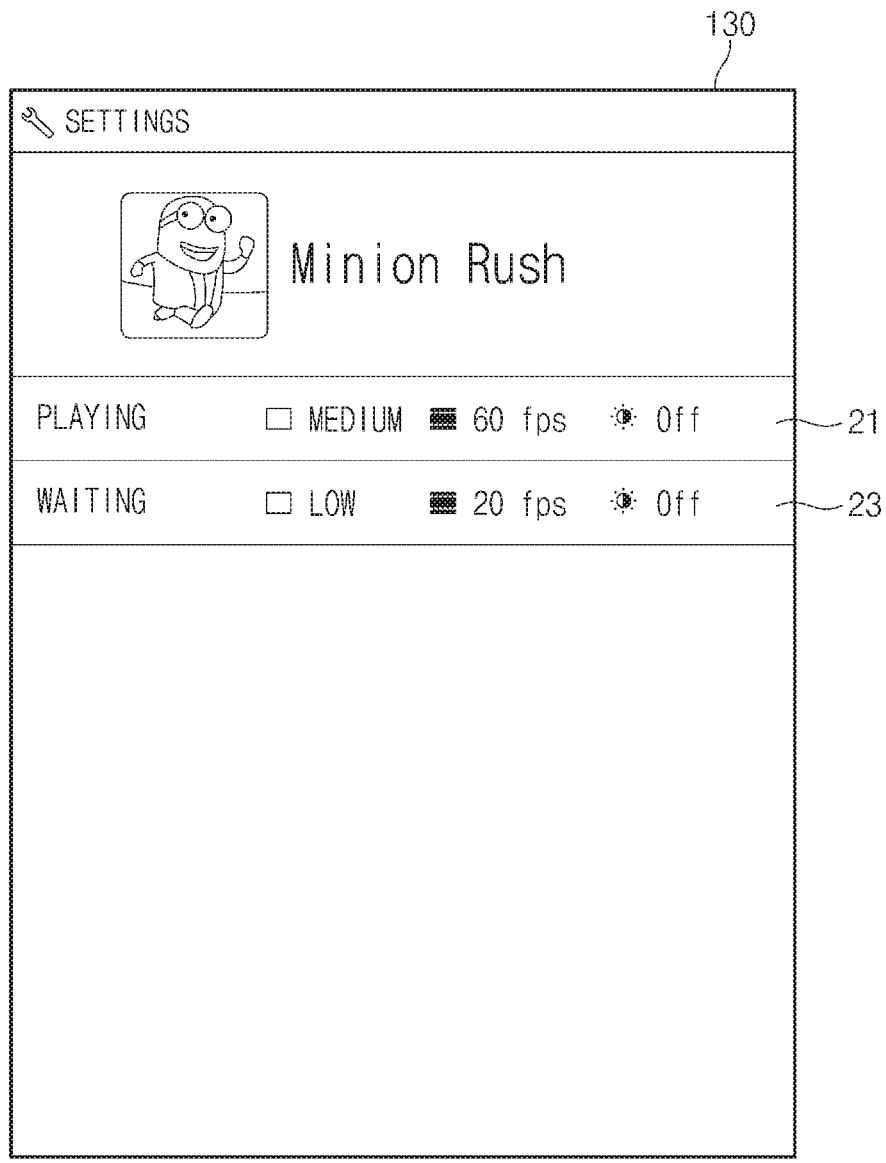

FIGS. 5A and 5B are drawings illustrating user interfaces, according to various embodiments of the present invention.

According to an embodiment, if a configuration setting application is executed, the processor 170 may display a user interface, which is provided by the configuration setting application, in the display 130. For example, if the configuration setting application is executed, the processor 170 may display the user interface illustrated in FIG. 5A or 5B.

Referring to FIG. 5A, the user interface may include an icon and a name of an application included in an application list. According to an embodiment, the user interface may include a first object 11 for changing a configuration setting mode of the application. For example, the first object 11 may be displayed for each application included in the application list. A user may change a configuration setting mode of each application through the first object 11. For example, the user may set the configuration setting mode as an auto mode AUTO or a manual mode MANUAL through the first object 11. The auto mode may be, for example, a mode in which the execution configuration of the application is controlled on the basis of the configuration setting information stored in the memory 150 without a user input. The manual mode may be, for example, a mode in which the execution configuration of the application is changed on the basis of the user input. With regard to the manual mode, for example, the user may change the execution configuration of the application by selecting one of pieces of configuration setting information (e.g., a best quality mode, a balance mode, a power saving mode, a hibernate mode, a full speed mode, and the like), which are set in advance according to specific purposes, regardless of the execution status of the application. As another example, the user may change the execution configuration of the application by independently setting each configuration (e.g., brightness of a display, a resolution of the display, a frame rate of the display, or the like) included in the configuration setting information.

According to an embodiment, the user interface may include a second object 13 indicating the configuration setting information that is applied to the current application. For example, the second object 13 may indicate at least one of a resolution of the display, a frame rate of the display, brightness of the display, a color format, a clock speed of a processor, and audio volume, which are applied to the current application. If the second object 13 associated with a specific application is selected by a user, a user interface indicating all configuration setting information of the selected application may be displayed, and the processor 170 may change the configuration setting information of the application through the corresponding user interface. According to an embodiment, in the case of an application of which a configuration setting mode is set as an auto mode, the change by a user may not be possible because the second object 13 is deactivated.

According to an embodiment, the user interface may include a third object 15 that makes it possible to add the application to the application list. For example, if the third object 15 is selected by the user, icons of all applications that are installed in the electronic device 100 may be displayed. The user may add a specific application to the application list by selecting a specific icon. If the application is added by a user, the processor 170 may transmit the changed application list to the server 200.

According to an embodiment, if the specific application is selected by the user, the processor 170 may display a user interface indicating the configuration setting information associated with the application. For example, if a 'Minion Rush' application is selected, the user interface illustrated in FIG. 5B may be displayed. Referring to FIG. 5B, the user interface may include all configuration setting information associated with the selected application. For example, the user interface may include first configuration setting information 21, which is capable of being applied while a user is played with a game, and second configuration setting information 23, which is capable of being applied while the user is in a standby state. For example, the configuration setting information included in the user interface may include the configuration setting information set (or changed) by the user as well as the configuration setting information received from a server.

Figure 6:
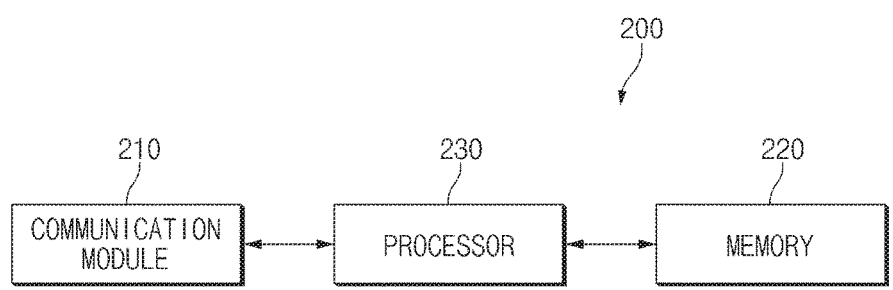
FIG. 6 is a block diagram illustrating a configuration of a server, according to various embodiments of the present invention.

FIG. 6 is a block diagram illustrating a configuration of a server, according to various embodiments of the present invention.

Referring to FIG. 6, the server 200 may include a communication module 210, a memory 220, and a processor 230.

According to an embodiment, the communication module 210 may communicate with an external device (e.g., the electronic device 100). According to an embodiment, the communication module 210 may transmit and receive data (e.g., application identification information, the configuration setting information, or the like) to and from an external device through a network (e.g., a mobile communication network or an Internet network).

According to an embodiment, the memory 220 may store an application list. According to an embodiment, the application list may include an application that belongs to a specified category (e.g., a game). The application list may include, for example, application identification information. For example, the application list may include a name of an application installation package or a name of an application.

According to an embodiment, the memory 220 may store the configuration setting information. The configuration setting information may include at least one of, for example, a resolution of a display, a frame rate of the display, brightness of the display, a color format, a clock speed of a processor, and audio volume. According to an embodiment, the memory 220 may store the pieces (e.g., two or more) of configuration setting information, which are set according to an execution status of each of applications, based on at least one of an application that are included in the application list, a model of an electronic device, a type of an operating system, and a version of the operating system.

According to an embodiment, the processor 230 may control overall operations of the server 200. According to an embodiment, the processor 230 may manage the configuration setting information of the application by controlling each of the communication module 210 and the memory 220.

According to an embodiment, the processor 230 may receive an application list from an external server through the communication module 210 and may store the received application list in the memory 220. For example, the server 200 may receive an application programming interface (API), which includes the application list belonging to a specified category (e.g., a server), from an application market. According to an embodiment, the server 200 may add the application to the application list based on information (e.g., a name of an application or package information) about the application input from a server manager. According to an embodiment, the processor 230 may transmit the application list to the electronic device 100 through the communication module 210. According to an embodiment, the processor 230 may receive the application list from the electronic device 100. If the application list received from the electronic device 100 is changed, the processor 230 may update the application list stored in the memory 220. If a new application is added to the application list by a user of the electronic device 100, the application list stored in the server 200 may be updated, and the server 200 may generate and store the configuration setting information about the newly added application.

According to an embodiment, the processor 230 may store the configuration setting information. The configuration setting information may include at least one of, for example, a resolution of the display, a frame rate of the display, brightness of the display, a color format, a clock speed of a processor, and audio volume.

According to an embodiment, the processor 230 may receive operating information (or an activity log) of each of a plurality of external electronic devices from the plurality of external electronic devices including the electronic device 100. The operating information may include information about at least one of, for example, remaining capacity of a battery, temperature of the electronic device, processor usage, whether hardware is accelerated, a power saving mode, a size of a frame buffer, a resolution of the display, brightness of the display, a brightness adjusting mode of the display, a frame rate of the display, a color format, a Do Not Disturb mode, received frequency of a user input, a type of a user input, user information (e.g., age of a user, gender of a user, or the like), whether an earphone is used, whether a charger is used, audio volume, a location of an electronic device, a name of an application being executed, an update type, a version of an application, a category of an application, an execution time of an application, or an execution status of an application (e.g., an execution stage of an application, whether a game mode is an auto play mode or a manual play mode, whether a user is playing with a war game, whether a game mode is a single player mode or a multi-player mode, the number of game participants, or the like). According to an embodiment, the processor 230 may analyze operating information and may generate and store the configuration setting information about the applications based on the analyzed result. For example, the processor 230 may sort pieces of operating information received from a plurality of electronic devices based on time and may analyze pieces of information at a point in time, when the application is executed, to generate the configuration setting information based on the execution status of each of applications included in the application list. For example, the processor 230 may analyze the execution status of the application based on a category of the application, the execution time of the application, a type of a user input, received frequency of a user input, or the like. On the basis of the analyzed result, the processor 230 may generate the configuration setting information based on the execution status of the application by analyzing a size of a frame buffer, a resolution of the display, brightness of the display, a brightness adjusting mode of the display, a frame rate of the display, a color format, or the like in a specific execution status. For example, in the case of an e-book application, in a state where the user reads a text, the processor 230 may generate the configuration setting information in which a frame rate is set to be low, and in a state where a page turn effect is displayed, the processor 230 may generate the configuration setting information in which a frame rate is set to be high. As another example, in the case of a game application, in a state where the game application is executed in an auto mode, the processor 230 may generate the configuration setting information in which a frame rate, a resolution, and brightness of the display are set to be low. In a state where the game application is executed in a manual mode, the processor 230 may generate the configuration setting information in which a frame rate, a resolution, and brightness of the display are set to be high. Whenever new operating information is received, the processor 230 may consistently update the configuration setting information.

According to an embodiment, the processor 230 may receive pieces of configuration setting information, which are set according to an execution status each of applications included in the application list, from an external server (e.g., a content providing server) and may store the received pieces of configuration setting information in the memory 220. For example, the server 200 may receive the configuration setting information, which is provided from a content provider, from a content providing server providing a specific service through each of the applications. For example, the processor 230 may store the pieces (e.g., two or more) of configuration setting information, which are set according to an execution status of each of applications, based on at least one of an application that is included in the application list, a model of an electronic device, and a type and a version of an operating system.

Below, table 1 indicates an example of the configuration setting information stored in the memory 220.

TABLE 1

| Application | Device Model | Configuration Setting Information |
| --- | --- | --- |
| Application 1 | Model 1 | Information 1 |
|  |  | Information 2 |
|  | Model 2 | Information 3 |
|  |  | Information 4 |
|  |  | Information 5 |
|  | Model 3 | Information 6 |
|  |  | Information 7 |
| Application 2 | Model 1 | Information 1 |
|  |  | Information 2 |
|  | Model 2 | Information 3 |
|  |  | Information 4 |
|  | Model 3 | Information 5 |
|  |  | Information 6 |

According to an embodiment, the processor 230 may store a table including pieces of (e.g., two or more) configuration setting information in the memory 220 for each application included in the application list and for each model of an electronic device. Referring to table 1, with regard to a first model Model 1 of a first application, the table may include, for example, first configuration setting information Information 1 corresponding to a first execution status of the application and second configuration setting information Information 2 corresponding to a second execution status of the application. With regard to a second model Model 2 of the first application, the table may include, for example, third configuration setting information Information 3 corresponding to the first execution status of the application, fourth configuration setting information Information 4 corresponding to the second execution status of the application, and fifth configuration setting information Information 5 corresponding to the third execution status of the application.

Below, table 2 indicates another example of the configuration setting information stored in the memory 220.

TABLE 2

| Application | OS | Version | Configuration Setting Information |
| --- | --- | --- | --- |
| Application 1 | OS 1 | Version 1 | Information 1 |
|  |  |  | Information 2 |
|  |  | Version 2 | Information 3 |
|  |  |  | Information 4 |
|  |  | Version 3 | Information 5 |
|  |  |  | Information 6 |

TABLE 2-continued

| Application | OS | Version | Configuration Setting Information |
|---|---|---|---|
| | OS 2 | Version 1 | Information 7 |
| | | | Information 8 |
| | | | Information 9 |
| | | Version 2 | Information 10 |
| | | | Information 11 |
| | | | Information 12 |

According to an embodiment, the processor 230 may store a table including pieces of (e.g., two or more) configuration setting information in the memory 220 for each application included in the application list, for each operating system type, and for each operating system version. Referring to table 2, with regard to a first application Application 1, the table may include, for example, first configuration setting information Information 1 corresponding to a first execution status of the application and second configuration setting information Information 2 corresponding to a second execution status of the application, in a first operating system OS 1 of a first version Version 1. With regard to a first application Application 1, the table may include, for example, third configuration setting information Information 3 corresponding to the first execution status of the application and fourth configuration setting information Information 4 corresponding to the second execution status of the application, in the first operating system OS 1 of a second version Version 2.

In addition to the above-mentioned embodiment, the processor 230 may store the configuration setting information based on the execution status of the application in view of user information (e.g., age of a user, gender of a user, or the like). For example, despite the execution status of the same application, in the case where the user is a man in twenties or the user is a woman in forties, the pieces of configuration setting information may be differently stored.

According to an embodiment, the processor 230 may receive the identification information of the application, which is installed or executed in the electronic device 100, from the electronic device 100. The identification information of the application may include, for example, a name of an application installation package or a name of the application. According to an embodiment, if the identification information of the application is received, the processor 230 may transmit pieces of configuration setting information corresponding to application identification information to the electronic device 100. While connected with the electronic device 100 through a network, the communication module 210 may receive at least one information of the model of the electronic device 100, the type of an operating system, and the version of an operating system from the electronic device 100. According to an embodiment, the processor 230 may verify the configuration setting information corresponding to the application, which is being installed or executed by the electronic device 100, in view of at least one of the model of the electronic device 100, the type of an operating system, and the version of an operating system and may transmit the verified configuration setting information to the electronic device 100.

At least some of operations associated with the server 200 described with reference to FIGS. 1, 2 and 6 may be executed by the electronic device 100 or another electronic device (e.g., a first external electronic device 902 or a second external electronic device 904 illustrated in FIG. 9, which will be described).

Figure 7:
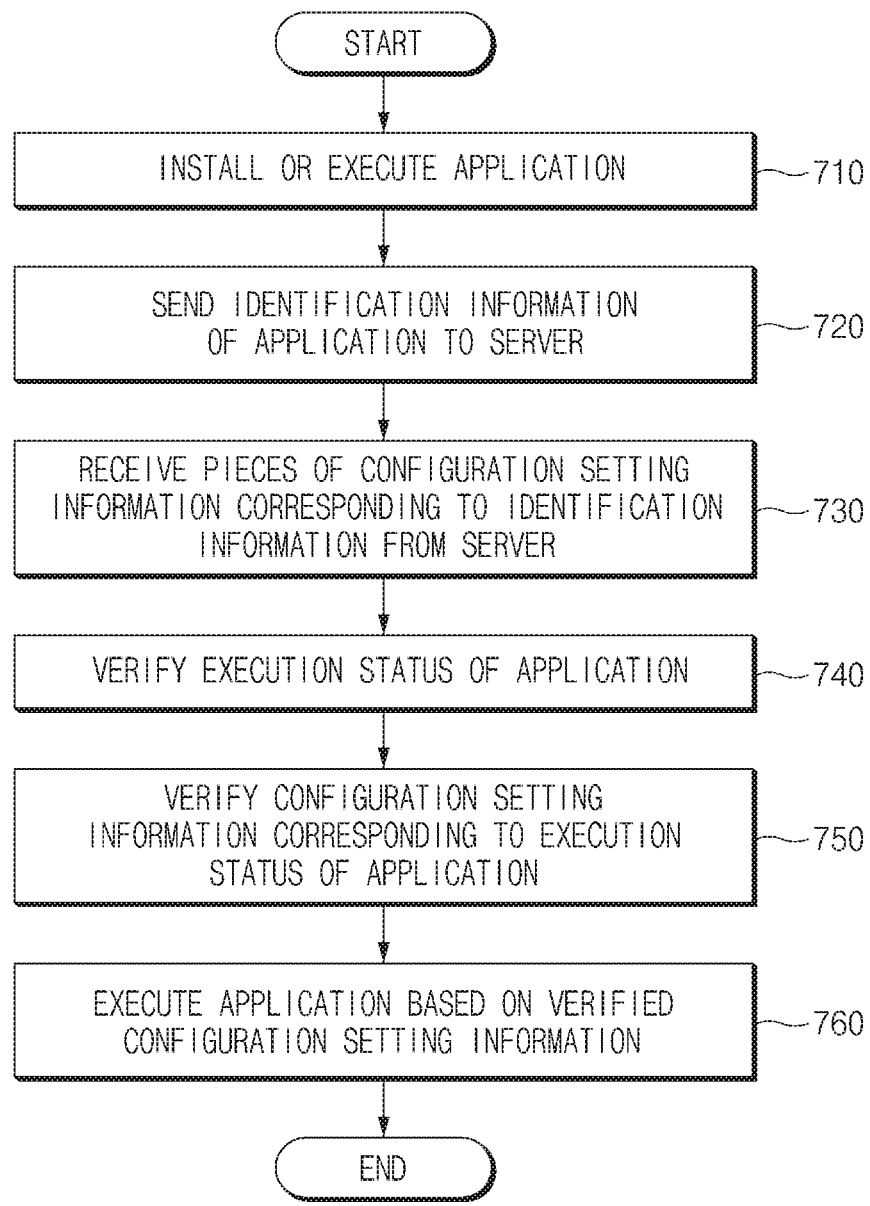
FIG. 7 is a flowchart illustrating a configuration setting method of an electronic device, according to various embodiments of the present invention.

FIG. 7 is a flowchart illustrating a configuration setting method of an electronic device, according to various embodiments of the present invention.

The flowchart illustrated in FIG. 7 may include operations which the electronic device 100 illustrated in FIG. 3 processes. Accordingly, even though omitted below, the above description about the electronic device 100 with reference to FIGS. 3 to 5 may be applied to the flowchart illustrated in FIG. 7.

Referring to FIG. 7, in operation 710, the electronic device 100 (e.g., the processor 170) may install or execute an application.

According to an embodiment, in operation 720, the electronic device 100 (e.g., the communication module 110) may transmit identification information of the application, which is being installed or executed, to the server 200. The identification information of the application may include, for example, a name of an application installation package or a name of the application.

According to an embodiment, in operation 730, the electronic device 100 (e.g., the communication module 110) may receive pieces of configuration setting information corresponding to the identification information from the server 200. The electronic device 100 may store the received pieces of configuration setting information in the memory 150.

According to an embodiment, in operation 740, the electronic device 100 (e.g., the processor 170) may verify an execution status of the application. According to an embodiment, the electronic device 100 may verify the execution status of the application based on at least one of received frequency of a user input (e.g., a touch input of a user), or the like. According to an embodiment, the electronic device 100 may verify the execution status of the application based on execution status information received from the application. According to an embodiment, the application may be programmed to provide the electronic device 100 with the execution status information. The execution status information may include, for example, various pieces of information indicating the execution status of the application such as a stage in which a game is being played, whether the game is in an auto play mode or in a manual play mode, whether a user is playing with a war game, whether the game is in a single player mode or in a multi-player mode, the number of game participants in the case of the multi-player mode, or the like. According to an embodiment, the electronic device 100 may verify the execution status of the application based on a change rate of an image that is displayed in a display according to execution of the application.

According to an embodiment, in operation 750, the electronic device 100 (e.g., the processor 170) may verify the configuration setting information corresponding to the execution status of the application. For example, the processor 170 may verify the configuration setting information, which corresponds to the execution status of the application, from among pieces of configuration setting information stored in the memory 150.

According to an embodiment, in operation 760, the electronic device 100 (e.g., the processor 170) may execute the application based on the verified configuration setting information. That is, the electronic device 100 may change the execution configuration of the application based on the verified configuration setting information. For example, the electronic device 100 may change at least one of a resolution of a display, a frame rate of the display, brightness of the display, a color format, a clock speed of a processor, and audio volume, based on the verified configuration setting information. According to an embodiment, when changing the execution configuration of the application, for example, in the case where the configuration setting information is changed to be greater than or equal to a specified reference value (e.g., change 30% or more based on the maximum value), the electronic device 100 may allow the configuration setting information to be gradually changed over a specified time period. According to an embodiment, if a specified user input is received while the execution status of the application is changed, the electronic device 100 may immediately change the execution configuration of the application based on the changed configuration setting information. According to an embodiment, the electronic device 100 may monitor the execution status of the application. If the execution status of the application is changed, the processor 170 may execute the application based on the configuration setting information corresponding to the changed execution status.

Figure 8:
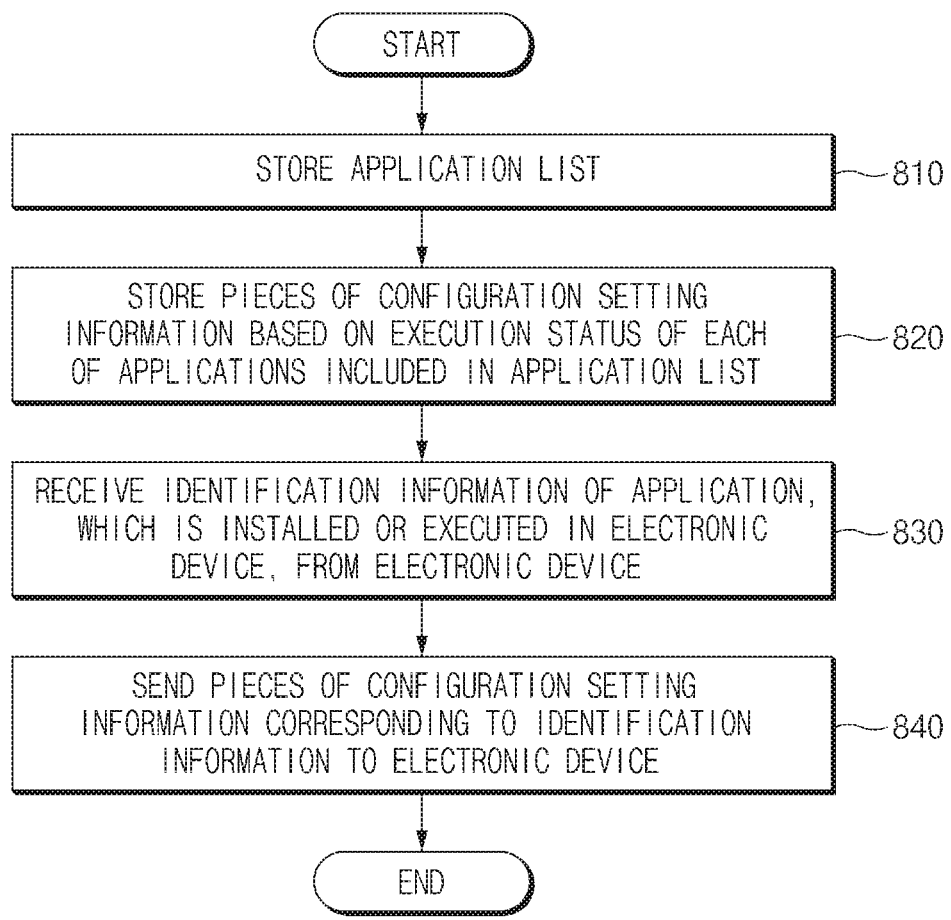
FIG. 8 is a flowchart illustrating configuration setting information managing method of a server, according to various embodiments of the present invention.

FIG. 8 is a flowchart illustrating configuration setting information managing method of a server, according to various embodiments of the present invention.

A flowchart illustrated in FIG. 8 may include operations that the server 200 illustrated in FIG. 6 processes. Accordingly, even though omitted below, the above description about the server 200 with reference to FIG. 6 may be applied to the flowchart illustrated in FIG. 8.

Referring to FIG. 8, in operation 810, the server 200 may store an application list. According to an embodiment, an application list may include an application that belongs to a specified category (e.g., a game). The application list stored in the server 200 may be shared with the electronic device 100.

According to an embodiment, the server 200 may receive the application list from an external server and may store the received application list. According to an embodiment, the server 200 may add the application to the application list based on information (e.g., a name of an application or package information) about the application input from a server manager. According to an embodiment, the server 200 may add the application to the application list based on the application list received from the electronic device 100.

According to an embodiment, in operation 820, the server 200 may store pieces of configuration setting information based on the execution status of each of applications included in the application list. The configuration setting information may include at least one of, for example, a resolution of a display, a frame rate of the display, brightness of the display, a color format, a clock speed of a processor, and audio volume. According to an embodiment, the server 200 may store the pieces (e.g., two or more) of configuration setting information, which is set according to an execution status of each of applications, based on at least one of an application included in the application list, a model of an electronic device, a type of an operating system, and a version of the operating system.

According to an embodiment, the server 200 may receive operating information (or an activity log) of each of a plurality of external electronic devices from the plurality of external electronic devices including the electronic device 100. The server 200 may analyze the received operating information and may generate and store the configuration setting information about each of the applications based on the analyzed result. According to an embodiment, the server 200 may receive pieces of configuration setting information, which are set according to an execution status of each of applications included in the application list, from an external server (e.g., a content providing server) and may store the received pieces of configuration setting information.

According to an embodiment, in operation 830, the server 200 may receive the identification information of the application, which is installed or executed in the electronic device 100, from the electronic device 100. The identification information of the application may include, for example, a name of an application installation package or a name of the application.

According to an embodiment, in operation 840, the server 200 may transmit pieces of configuration setting information corresponding to application identification information to the electronic device 100. While connected with the electronic device 100 through a network, the server 200 may receive at least one information of the model of the electronic device 100, the type of an operating system, and the version of an operating system from the electronic device 100. According to an embodiment, the server 200 may verify the configuration setting information corresponding to the application, which is being installed or executed by the electronic device 100, in view of at least one of the model of the electronic device 100, the type of an operating system, and the version of an operating system and may transmit the verified configuration setting information to the electronic device 100.

Figure 9:
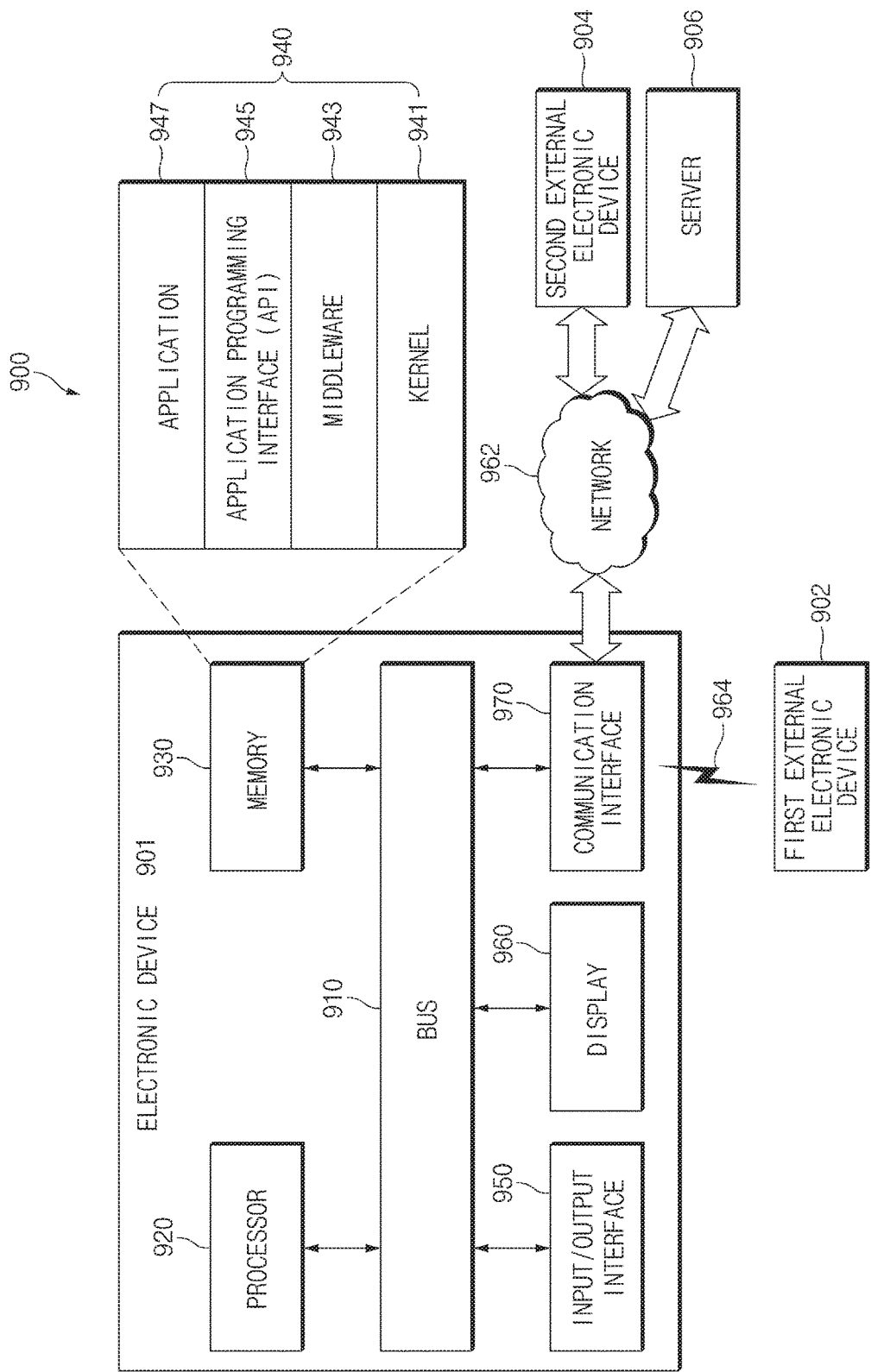
FIG. 9 is a diagram illustrating an electronic device, according to various embodiments of the present invention.

FIG. 9 illustrates an electronic device in a network environment according to an embodiment of the present disclosure.

An electronic device 901 in a network environment 900 according to various embodiments of the present disclosure will be described with reference to FIG. 9. The electronic device 901 may include a bus 910, a processor 920, a memory 930, an input/output interface 950, a display 960, and a communication interface 970. In various embodiments of the present disclosure, at least one of the foregoing elements may be omitted or another element may be added to the electronic device 901.

The bus 910 may include a circuit for connecting the above-mentioned elements 910 to 970 to each other and transferring communications (e.g., control messages and/or data) among the above-mentioned elements.

The processor 920 may include at least one of a central processing unit (CPU), an application processor (AP), or a communication processor (CP). The processor 920 may perform data processing or an operation related to communication and/or control of at least one of the other elements of the electronic device 901.

The memory 930 may include a volatile memory and/or a nonvolatile memory. The memory 930 may store instructions or data related to at least one of the other elements of the electronic device 901. According to an embodiment of the present disclosure, the memory 930 may store software and/or a program 940. The program 940 may include, for example, a kernel 941, a middleware 943, an application programming interface (API) 945, and/or an application program (or an application) 947. At least a portion of the kernel 941, the middleware 943, or the API 945 may be referred to as an operating system (OS).

The kernel 941 may control or manage system resources (e.g., the bus 910, the processor 920, the memory 930, or the like) used to perform operations or functions of other programs (e.g., the middleware 943, the API 945, or the application program 947). Furthermore, the kernel 941 may provide an interface for allowing the middleware 943, the API 945, or the application program 947 to access individual elements of the electronic device 901 in order to control or manage the system resources.

The middleware 943 may serve as an intermediary so that the API 945 or the application program 947 communicates and exchanges data with the kernel 941.

Furthermore, the middleware 943 may handle one or more task requests received from the application program 947 according to a priority order. For example, the middleware 943 may assign at least one application program 947 a priority for using the system resources (e.g., the bus 910, the processor 920, the memory 930, or the like) of the electronic device 901. For example, the middleware 943 may handle the one or more task requests according to the priority assigned to the at least one application, thereby performing scheduling or load balancing with respect to the one or more task requests.

The API 945, which is an interface for allowing the application 947 to control a function provided by the kernel 941 or the middleware 943, may include, for example, at least one interface or function (e.g., instructions) for file control, window control, image processing, character control, or the like.

The input/output interface 950 may serve to transfer an instruction or data input from a user or another external device to (an)other element(s) of the electronic device 901. Furthermore, the input/output interface 950 may output instructions or data received from (an)other element(s) of the electronic device 901 to the user or another external device.

The display 960 may include, for example, a liquid crystal display (LCD), a light-emitting diode (LED) display, an organic light-emitting diode (OLED) display, a microelectromechanical systems (MEMS) display, or an electronic paper display. The display 960 may present various content (e.g., a text, an image, a video, an icon, a symbol, or the like) to the user. The display 960 may include a touch screen, and may receive a touch, gesture, proximity or hovering input from an electronic pen or a part of a body of the user.

The communication interface 970 may set communications between the electronic device 901 and an external device (e.g., a first external electronic device 902, a second external electronic device 904, or a server 906). For example, the communication interface 970 may be connected to a network 962 via wireless communications or wired communications so as to communicate with the external device (e.g., the second external electronic device 904 or the server 906).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 964. The short-range communications may include at least one of wireless fidelity (Wi-Fi), Bluetooth™, Bluetooth™ low energy (BLE), Zigbee™, near field communication (NFC), magnetic secure transmission (MST), or GNSS. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), plain old telephone service (POTS), or the like. The network 962 may include at least one of telecommunications networks, for example, a computer network (e.g., local area network (LAN) or wide area network (WAN)), the Internet, or a telephone network.

The types of the first external electronic device 902 and the second external electronic device 904 may be the same as or different from the type of the electronic device 901. According to an embodiment of the present disclosure, the server 906 may include a group of one or more servers. A portion or all of operations performed in the electronic device 901 may be performed in one or more other electronic devices (e.g., the first electronic device 902, the second external electronic device 904, or the server 906). When the electronic device 901 should perform a certain function or service automatically or in response to a request, the electronic device 901 may request at least a portion of functions related to the function or service from another device (e.g., the first electronic device 902, the second external electronic device 904, or the server 906) instead of or in addition to performing the function or service for itself. The other electronic device (e.g., the first electronic device 902, the second external electronic device 904, or the server 906) may perform the requested function or additional function, and may transfer a result of the performance to the electronic device 901. The electronic device 901 may use a received result itself or additionally process the received result to provide the requested function or service. To this end, for example, a cloud computing technology, a distributed computing technology, or a client-server computing technology may be used.

Figure 10:
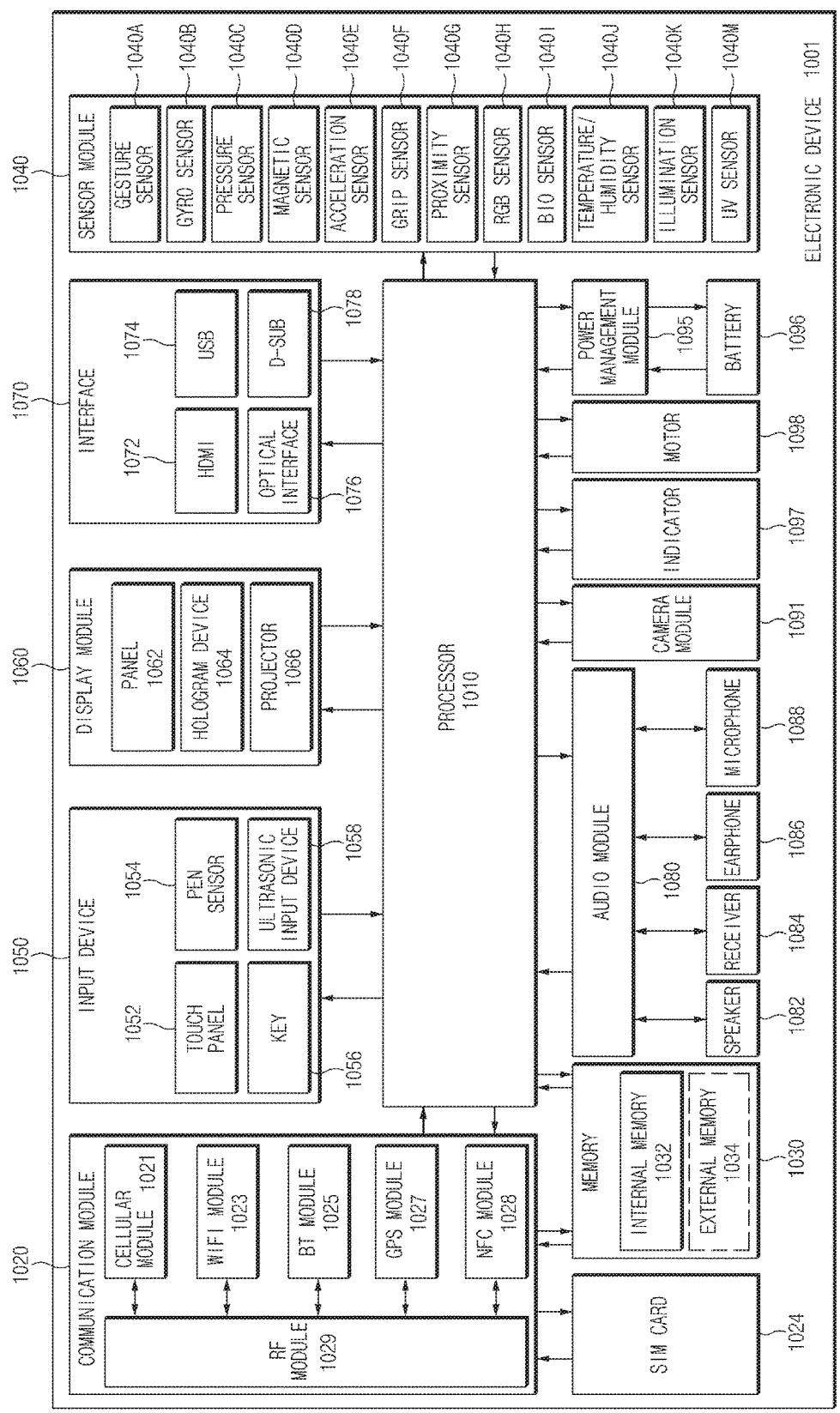
FIG. 10 is an illustration of a block diagram of an electronic device, according to various embodiments of the present invention.

FIG. 10 is a block diagram illustrating an electronic device according to an embodiment of the present disclosure.

Referring to FIG. 10, an electronic device 1001 may include, for example, a part or the entirety of the electronic device 901 illustrated in FIG. 9. The electronic device 1001 may include at least one processor (e.g., AP) 1010, a communication module 1020, a subscriber identification module (SIM) 1024, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may run an operating system or an application program so as to control a plurality of hardware or software elements connected to the processor 1010, and may process various data and perform operations. The processor 1010 may be implemented with, for example, a system on chip (SoC). According to an embodiment of the present disclosure, the processor 1010 may further include a graphic processing unit (GPU) and/or an image signal processor. The processor 1010 may include at least a portion (e.g., a cellular module 1021) of the elements illustrated in FIG. 10. The processor 1010 may load, on a volatile memory, an instruction or data received from at least one of other elements (e.g., a nonvolatile memory) to process the instruction or data, and may store various data in a nonvolatile memory.

The communication module 1020 may have a configuration that is the same as or similar to that of the communication interface 970 of FIG. 9. The communication module 1020 may include, for example, a cellular module 1021, a Wi-Fi module 1023, a Bluetooth™ module 1025, a GNSS module 1027 (e.g., a GPS module, a GLONASS module, a BeiDou module, or a Galileo module), an NFC module 1028 and a radio frequency (RF) module 1029.

The cellular module 1021 may provide, for example, a voice call service, a video call service, a text message service, or an Internet service through a communication network. The cellular module 1021 may identify and authenticate the electronic device 1001 in the communication network using the subscriber identification module 1024 (e.g., a SIM card). The cellular module 1021 may perform at least a part of functions that may be provided by the processor 1010. The cellular module 1021 may include a communication processor (CP).

Each of the Wi-Fi module 1023, the Bluetooth™ module 1025, the GNSS module 1025 and the NFC module 1028 may include, for example, a processor for processing data transmitted/received through the modules. According to some various embodiments of the present disclosure, at least a part (e.g., two or more) of the cellular module 1021, the Wi-Fi module 1023, the Bluetooth™ module 1025, the GNSS module 1027 and the NFC module 1028 may be included in a single integrated chip (IC) or IC package.

The RF module 1029 may transmit/receive, for example, communication signals (e.g., RF signals). The RF module 1029 may include, for example, a transceiver, a power amp module (PAM), a frequency filter, a low noise amplifier (LNA), an antenna, or the like. According to another embodiment of the present disclosure, at least one of the cellular module 1021, the Wi-Fi module 1023, the Bluetooth™ module 1025, the GNSS module 1027 and the NFC module 1028 may transmit/receive RF signals through a separate RF module.

The SIM 1024 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1030 (e.g., the memory 930) may include, for example, an internal memory 1032 or an external memory 1034. The internal memory 1032 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1034 may include a flash drive such as a compact flash (CF), a secure digital (SD), a Micro-SD, a Mini-SD, an extreme digital (xD), a MultiMediaCard (MMC), a memory stick, or the like. The external memory 1034 may be operatively and/or physically connected to the electronic device 1001 through various interfaces.

The sensor module 1040 may, for example, measure physical quantity or detect an operation state of the electronic device 1001 so as to convert measured or detected information into an electrical signal. The sensor module 1040 may include, for example, at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (e.g., a red/green/blue (RGB) sensor), a biometric sensor 1040I, a temperature/humidity sensor 1040J, an illumination sensor 1040K, or an ultraviolet (UV) sensor 1040M. Additionally or alternatively, the sensor module 1040 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1040 may further include a control circuit for controlling at least one sensor included therein. In some various embodiments of the present disclosure, the electronic device 1001 may further include a processor configured to control the sensor module 1040 as a part of the processor 1010 or separately, so that the sensor module 1040 is controlled while the processor 1010 is in a sleep state.

The input device 1050 may include, for example, a touch panel 1052, a (digital) pen sensor 1054, a key 1056, or an ultrasonic input device 1058. The touch panel 1052 may employ at least one of capacitive, resistive, infrared, and ultraviolet sensing methods. The touch panel 1052 may further include a control circuit. The touch panel 1052 may further include a tactile layer so as to provide a haptic feedback to a user.

The (digital) pen sensor 1054 may include, for example, a sheet for recognition which is a part of a touch panel or is separate. The key 1056 may include, for example, a physical button, an optical button, or a keypad. The ultrasonic input device 1058 may sense ultrasonic waves generated by an input tool through a microphone 1088 so as to identify data corresponding to the ultrasonic waves sensed.

The display 1060 (e.g., the display 960) may include a panel 1062, a hologram device 1064, or a projector 1066. The panel 1062 may have a configuration that is the same as or similar to that of the display 960 of FIG. 9. The panel 1062 may be, for example, flexible, transparent, or wearable. The panel 1062 and the touch panel 1052 may be integrated into a single module. The hologram device 1064 may display a stereoscopic image in a space using a light interference phenomenon. The projector 1066 may project light onto a screen so as to display an image. The screen may be disposed in the inside or the outside of the electronic device 1001. According to an embodiment of the present disclosure, the display 1060 may further include a control circuit for controlling the panel 1062, the hologram device 1064, or the projector 1066.

The interface 1070 may include, for example, an HDMI 1072, a USB 1074, an optical interface 1076, or a D-subminiature (D-sub) 1078. The interface 1070, for example, may be included in the communication interface 970 illustrated in FIG. 9. Additionally or alternatively, the interface 1070 may include, for example, a mobile high-definition link (MHL) interface, an SD card/multi-media card (MMC) interface, or an infrared data association (IrDA) interface.

The audio module 1080 may convert, for example, a sound into an electrical signal or vice versa. At least a portion of elements of the audio module 1080 may be included in the input/output interface 950 illustrated in FIG. 9. The audio module 1080 may process sound information input or output through a speaker 1082, a receiver 1084, an earphone 1086, or the microphone 1088.

The camera module 1091 is, for example, a device for shooting a still image or a video. According to an embodiment of the present disclosure, the camera module 1091 may include at least one image sensor (e.g., a front sensor or a rear sensor), a lens, an image signal processor (ISP), or a flash (e.g., an LED or a xenon lamp).

The power management module 1095 may manage power of the electronic device 1001. According to an embodiment of the present disclosure, the power management module 1095 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, or the like. The motor 1098 may convert an electrical signal into a mechanical vibration, and may generate a vibration or haptic effect. Although not illustrated, a processing device (e.g., a GPU) for supporting a mobile TV may be included in the electronic device 1001. The processing device for supporting a mobile TV may process media data according to the standards of digital multimedia broadcasting (DMB), digital video broadcasting (DVB), Media-FLO™, or the like.

Figure 11:
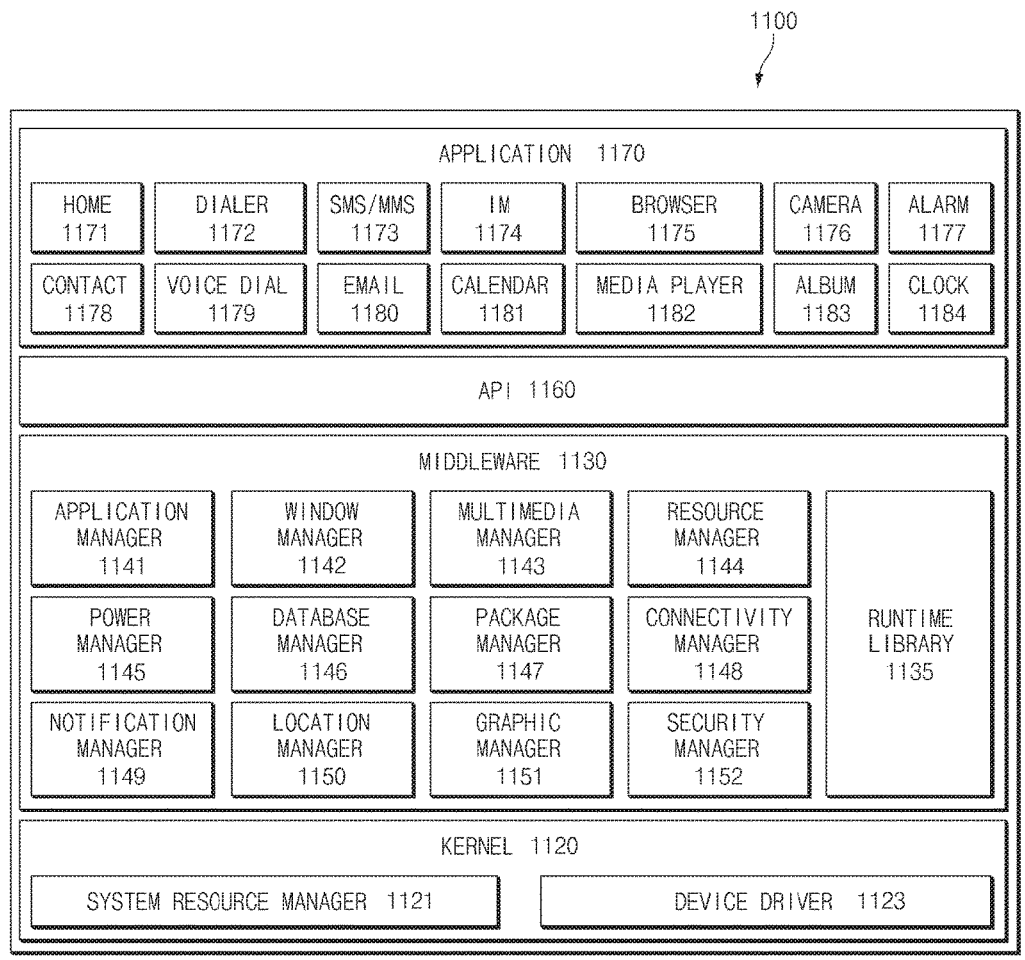
FIG. 11 is an illustration of a block diagram of a program module, according to various embodiments of the present invention.

FIG. 11 is a block diagram illustrating a program module according to an embodiment of the present disclosure.

Referring to FIG. 11, a program module 1100 (e.g., the program 940) may include an operating system (OS) for controlling a resource related to an electronic device (e.g., the electronic device 901) and/or various applications (e.g., the application program 947) running on the OS. The operating system may be, for example, Android™, iOS™, Windows™, Symbian, Tizen™, or the like.

The program module 1100 may include a kernel 1120, a middleware 1130, an API 1160, and/or an application 1170. At least a part of the program module 1100 may be preloaded on an electronic device or may be downloaded from an external electronic device (e.g., the first electronic device 902, the second external electronic device 904, or the server 906).

The kernel 1120 (e.g., the kernel 941) may include, for example, a system resource manager 1121 or a device driver 1123. The system resource manager 1121 may perform control, allocation, or retrieval of a system resource. According to an embodiment of the present disclosure, the system resource manager 1121 may include a process management unit, a memory management unit, a file system management unit, or the like. The device driver 1123 may include, for example, a display driver, a camera driver, a Bluetooth™ driver, a shared memory driver, a USB driver, a keypad driver, a Wi-Fi driver, an audio driver, or an inter-process communication (IPC) driver.

The middleware 1130, for example, may provide a function that the applications 1170 require in common, or may provide various functions to the applications 1170 through the API 1160 so that the applications 1170 may efficiently use limited system resources in the electronic device. According to an embodiment of the present disclosure, the middleware 1130 (e.g., the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151 and a security manager 1152.

The runtime library 1135 may include, for example, a library module that a complier uses to add a new function through a programming language while the application 1170 is running. The runtime library 1135 may perform a function for input/output management, memory management, or an arithmetic function.

The application manager 1141 may mange, for example, a life cycle of at least one of the applications 1170. The window manager 1142 may manage a GUI resource used in a screen. The multimedia manager 1143 may recognize a format used for playing various media files and may encode or decode a media file using a codec matched to the format. The resource manager 1144 may manage a resource such as a source code, a memory, or a storage space of at least one of the applications 1170.

The power manager 1145, for example, may operate together with a basic input/output system (BIOS) to manage a battery or power and may provide power information used for operating the electronic device. The database manager 1146 may generate, search, or modify a database to be used in at least one of the applications 1170. The package manager 1147 may manage installation or update of an application distributed in a package file format.

The connectivity manager 1148 may manage wireless connection of Wi-Fi, Bluetooth™, or the like. The notification manager 1149 may display or notify an event such as message arrival, appointments, and proximity alerts in such a manner as not to disturb a user. The location manager 1150 may manage location information of the electronic device. The graphic manager 1151 may manage a graphic effect to be provided to a user or a user interface related thereto. The security manager 1152 may provide various security functions used for system security or user authentication. According to an embodiment of the present disclosure, in the case in which an electronic device (e.g., the electronic device 901) includes a phone function, the middleware 1130 may further include a telephony manager for managing a voice or video call function of the electronic device.

The middleware 1130 may include a middleware module for forming a combination of various functions of the above-mentioned elements. The middleware 1130 may provide a module specialized for each type of an operating system to provide differentiated functions. Furthermore, the middleware 1130 may delete a part of existing elements or may add new elements dynamically.

The API 1160 (e.g., the API 945) which is, for example, a set of API programming functions may be provided in different configurations according to an operating system. For example, in the case of Android or iOS, one API set may be provided for each platform, and, in the case of Tizen™, at least two API sets may be provided for each platform.

The application 1170 (e.g., the application program 947), for example, may include at least one application capable of performing functions such as a home 1171, a dialer 1172, an SMS/MMS 1173, an instant message (IM) 1174, a browser 1175, a camera 1176, an alarm 1177, a contact 1178, a voice dial 1179, an e-mail 1180, a calendar 1181, a media player 1182, an album 1183, a clock 1184, health care (e.g., measure an exercise amount or blood sugar), or environmental information provision (e.g., provide air pressure, humidity, or temperature information).

According to an embodiment of the present disclosure, the application 1170 may include an information exchange application for supporting information exchange between the electronic device (e.g., the electronic device 901) and an external electronic device (e.g., the first electronic device 902 or the second external electronic device 904). The information exchange application may include, for example, a notification relay application for relaying specific information to the external electronic device or a device management application for managing the external electronic device.

For example, the notification relay application may have a function for relaying, to an external electronic device (e.g., the first electronic device 902 or the second external electronic device 904), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 902 or the second external electronic device 904) communicating with the electronic device, an application running in the external electronic device, or a service (e.g., a call service, a message service, or the like) provided from the external electronic device.

According to an embodiment of the present disclosure, the application 1170 may include a specified application (e.g., a healthcare application of a mobile medical device) according to an attribute of the external electronic device (e.g., the first electronic device 902 or the second external electronic device 904). The application 1170 may include an application received from an external electronic device (e.g., the first electronic device 902 or the second external electronic device 904). The application 1170 may include a preloaded application or a third-party application downloadable from a server. The names of the elements of the program module 1100 illustrated may vary with the type of an operating system.

According to various embodiments of the present disclosure, at least a part of the program module 1100 may be implemented with software, firmware, hardware, or a combination thereof. At least a part of the program module 1100, for example, may be implemented (e.g., executed) by a processor (e.g., the processor 1010). At least a part of the program module 1100 may include, for example, a module, a program, a routine, sets of instructions, or a process for performing at least one function.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media in the form of a program module. The instruction, when executed by a processor, may cause the one or more processors to perform a function corresponding to the instruction. A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). The program instructions may include machine language codes generated by compilers and high-level language codes that can be executed by computers using interpreters.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present invention, an execution configuration of an application may be automatically changed through interworking with a server without settings of a user, and a service may be provided in an application execution configuration optimized according to an execution status of the application.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a communication module configured to communicate with a server; and
   a processor,
   wherein the processor is configured to:
   when an application is installed or executed, transmit identification information of the application to the server through the communication module;
   receive pieces of configuration setting information corresponding to the identification information from the server;
   verify an execution status of the application based on execution status information received from the application;
   verify configuration setting information that corresponds to the execution status of the application from among the pieces of configuration setting information;
   change an execution configuration of the application based on the verified configuration setting information; and
   when a difference between the verified configuration setting information and current configuration setting information is greater than or equal to a specified reference value, gradually change the execution configuration of the application for a specified time period.

2. The electronic device of claim 1, wherein each of the pieces of configuration setting information comprises:
   at least one of a resolution of a display, a frame rate of the display, a brightness of the display, a color format, a clock speed of the processor, or an audio volume.

3. The electronic device of claim 1, further comprising:
an input module configured to receive a user input,
wherein the processor is further configured to:
verify the execution status of the application based on received frequency of the user input.

4. The electronic device of claim 1, further comprising:
an input module configured to receive a user input,
wherein the processor is further configured to:
when a user input for changing the configuration setting information is received, execute the application based on the changed configuration setting information; and
transmit the changed configuration setting information to the server.

5. The electronic device of claim 1, further comprising:
a memory configured to store an application list,
wherein the processor is configured to:
when the application is included in the application list, transmit the identification information of the application to the server.

6. The electronic device of claim 5, further comprising:
an input module configured to receive a user input,
wherein the processor is configured to:
add the application to the application list based on the user input; and
transmit the application list, to which the application is added, to the server through the communication module.

7. A server comprising:
a communication module configured to communicate with an electronic device;
a memory; and
a processor,
wherein the processor is configured to:
store an application list in the memory;
receive operating information of each of a plurality of external electronic devices from the plurality of external electronic devices including the electronic device;
generate pieces of configuration setting information based on the operating information;
store the pieces of configuration setting information in the memory;
receive identification information of an application, which is installed or executed in the electronic device, from the electronic device through the communication module; and
transmit the pieces of configuration setting information corresponding to the identification information to the electronic device,
wherein the pieces of configuration setting information comprise:
first configuration setting information corresponding to a first execution status of the application; and
second configuration setting information corresponding to a second execution status of the application, and
wherein at least one of the first or second configuration setting information is verified, and, when a difference between the verified configuration setting information and current configuration setting information is greater than or equal to a specified reference value, an execution configuration of the application is gradually changed for a specified time period.

8. The server of claim 7, wherein the operating information comprises:
information about at least one of remaining capacity of a battery, temperature of the electronic device, processor usage, whether hardware is accelerated, a power saving mode, a size of a frame buffer, a resolution of a display, brightness of the display, a brightness adjusting mode of the display, a frame rate of the display, a color format, a Do Not Disturb mode, received frequency of a user input, a type of a user input, whether an earphone is used, whether a charger is used, audio volume, a location of the electronic device, a name of the application being executed, an update type, a version of the application, a category of the application, an execution time of the application, or an execution status of the application.

9. The server of claim 7, wherein the processor is further configured to:
receive the pieces of configuration setting information based on the execution status of each of the applications, which are included in the application list, from an external server; and
store the received pieces of configuration setting information in the memory.

10. The server of claim 7, wherein each of the pieces of configuration setting information comprises:
at least one of a resolution of a display, a frame rate of the display, a brightness of the display, a color format, a clock speed of the processor, or an audio volume.

11. The server of claim 7, wherein the processor is further configured to:
store the pieces of configuration setting information in the memory based on at least one of a model of the electronic device, a type of an operating system, a version of the operating system, or the applications included in the application list.

12. A configuration setting method of an electronic device, the method comprising:
when an application is installed or executed, transmitting identification information of the application to a server through a communication module;
receiving pieces of configuration setting information corresponding to the identification information from the server;
verifying an execution status of the application based on execution status information received from the application;
selecting configuration setting information that corresponds to the execution status of the application from among the pieces of configuration setting information; and
changing an execution configuration of the application based on the selected configuration setting information,
wherein the changing of the execution configuration of the application comprises:
comparing the selected configuration setting information with current configuration setting information; and
when a difference between the selected configuration setting information and the current configuration setting information is greater than or equal to a specified reference value, gradually changing the execution configuration of the application for a specified time period.

13. The method of claim 12, wherein each of the pieces of configuration setting information comprises:
at least one of a resolution of a display, a frame rate of the display, a brightness of the display, a color format, a clock speed of a processor, or an audio volume.

14. The method of claim 12, wherein the verifying of the execution status of the application comprises:

verifying the execution status of the application based on received frequency of a user input.

15. The method of claim 12, further comprising:

receiving a user input for changing the configuration setting information;

executing the application based on the changed configuration setting information; and transmitting the changed configuration setting information to the server.

* * * * *